Patented Jan. 22, 1946

2,393,573

UNITED STATES PATENT OFFICE 2,393,573

ALBINO ASPHALT EMULSION PAINT

Harry J. Sommer, Lafayette, Calif., assignor to Shell Development Company, San Francisco, Calif., a corporation of Delaware No Drawing. Application June 30, 1943,
Serial No. 492,971

17 Claims. (Cl. 106—277)

The present invention relates to colored aqueous emulsions of albino asphalt (also known as petroleum plastics) suitable for painting purposes and pertains more particularly to albino asphalt emulsion paints of increased resistance to deterioration and to methods of making said improved emulsions.

Heretofore, it has been proposed to use colored albino asphalt emulsions as inexpensive paints for roofs, barns, etc., and particularly as camouflage paints. It may also be desirous to use these colored emulsions in making colored pavements, traffic stripes, etc. These emulsions have been prepared, for example, by mixing an aqueous albino asphalt emulsion, containing emulsifiers, such as casein, rosin soaps, alkalies, etc., and mixtures thereof, including free alkalies, with an aqueous dispersion of finely divided pigment together with bentonite or the like. However, the albino asphalt emulsion paints prepared by previously-proposed methods have been found to be unsatisfactory with regard to color fading, darkening of the albino asphaltic binder, checking, cracking, general disintegration, etc.

It is therefore an object of this invention to provide a method of preparing a colored albino asphalt emulsion paint of improved characteristics, particularly with respect to fading and disintegration.

It is another object to provide a colored albino asphalt emulsion of increased resistance to color fading and darkening of the albino asphalt binder on exposure to ultra-violet light.

A further object of this invention is to provide a colored albino asphalt emulsion containing an additive dispersed in the albino asphalt prior to emulsification which additive imparts fade resistance to the emulsion paint but does not adversely affect the emulsifiers or the emulsification.

Additional objects and advantages of the present invention will be readily apparent from the following description.

The method of the present invention comprises the steps of incorporating an oleophilic cationic surface-active agent in albino asphalt before emulsification, forming an aqueous emulsion of albino asphalt with ammonium salts of detergent-forming acids together with an excess of ammonia, and adding to the resultant emulsion a water-insoluble pigment, preferably, in an aqueous dispersion containing in addition, preferably, at least 0.5% and up to about 5% or more of a highly swellable or colloidal substance, such as bentonite or the like. Bentonite or the like was found to be highly desirable in these emulsions containing cation active compounds in order to obtain maximum stability. The resultant colored emulsion may be milled to improve its homogeneity.

Suitable oleophilic cation active wetting agents which are effective for the purpose of the present invention include, for example, quaternary ammonium compounds and the analogous phosphorus, sulfur, arsenic, antimony, etc., compounds; their salts; their derivatives, such as chloro-, hydroxo-, sulfo-, ether, ester, etc.; primary, secondary or tertiary, mono or poly amines and their derivatives, etc. These groups of compounds include aliphatic, cyclic, nuclear or extranuclear compounds, preferably containing at least one aliphatic saturated hydrocarbon chain of at least 8 and preferably 10 or more, carbon atoms. Such compounds are represented by trimethyl cetyl ammonium chloride, lauryl pyridinium chloride, the quaternary salt of diethyl aminoethyl oleyl amide, lauryl quinaldinium bromide, triethyl hexadecyl phosphonium bromide, the ternary sulfonium compound: methyl ethyl cetyl sulfonium methyl sulfate, methyl stearyl amine, chloropalmityl amine, stearic ester of ethanol amine, etc. For additional agents and their methods of manufacture see, for example, Dohse et al., U. S. Patent 2,191,295.

Cation surface active wetting agents, which were found to be particularly suitable, may be obtained from wax by chlorination and ammonolysis, the former being conducted at a temperature of about 110° C. until a chlorine content of about 30% is reached, and the latter step taking place at about 150° C. in the presence of a solvent, such as alcohol. In the following description these cation active compounds will be referred to as "paraffin wax amines," or "wax amines."

A similar group of amines, likewise highly effective for the purposes of the present invention, are the alpha branched aliphatic primary amines, having more than 12 carbon atoms, which are derived from aliphatic mono-olefins by hydrochlorination and ammonolysis, and will be referred to as "alpha methyl amine" or "alpha amine" for short.

The range of concentration of the cation active agent in the albino asphalt suitable for my purpose is from about 0.1% to 3% or more, and preferably .5 to 2%, by weight, based on the albino asphalt.

The ammonium salts are formed by combination of detergent-forming acids with ammonia, ammonium hydroxide or organic amines having up to 8 carbon atoms and preferably less than 6 carbon atoms and are used together with an excess of free ammonia or ammonium hydroxide as the emulsifier for the emulsification of the albino asphalt. In order that the cationic surface active agent, such as the preferred paraffin wax amines, be most effective, it is essential that no alkaline-reacting metal compounds, e. g. sodium, potassium and alkaline earth hydroxides, carbonates, soap, etc., be present. On the other hand, albino asphalt-in-water emulsions are not generally suitable for the present purpose when the aqueous phase is acidic since they must be compatible with alkaline pigments and must be applied to alkaline surfaces, such as plaster walls, etc. Thus, it is highly desirable to maintain the aqueous phase on the alkaline side, such as about a pH of 8.0 and preferably about about 9.5 and up to about 11.0 when paraffin wax amines and other cationic active substances are present in the albino asphalt. For this purpose, enough excess ammonia is added to attain this alkalinity. Acids suitable for this purpose include straight chain and branched chain, saturated and unsaturated, fatty and alicyclic acids having at least 8 carbon atoms, such as abietic acid, melissic acid, lauric acid, myristic acid, palmitic acid, stearic acid, undecylenic acid, oleic acid, ricinoleic acid, di-ricinoleic acid, polyricinoleic acid, ricinoleyl lactic acid, acetyl-ricinoleic acid, linoleic acid, linolenic acid, mixtures of any two or more of the above mentioned acids or other acids; mixed higher fatty acids derived from animal or vegetable sources, for example, cocoanut oil, rapeseed oil, sesame oil, palm oil, corn oil, cottonseed oil, castor oil, soyabean oil, peanut oil, seal oils, sardine oil, etc.; naturally-occurring petroleum acids, such as napthenic acids, and carboxy acids produced by the oxidation of petroleum; sulfonic acids, such as mahogany acids; sulfate ester acids, and other detergent-forming acids which combine with ammonia to produce soap-like bodies capable of yielding emulsions of albino asphalt in water.

Suitable pigments include, for example, iron oxide red, chromium oxide green, yellow ochre, cadmium yellow, raw umber, ultramarine blue, cobalt blue, titanium oxide, sublimed white lead, lithopone, metallic bronzes (e. g. copper, brass, aluminum, iron, etc.), and mixtures of the foregoing. Preferably the pigments are dispersed in water with the aid of a suspending agent, such as a highly swellable or colloidal substance, e. g. bentonite, and this dispersion is then admixed with the aqueous albino asphalt emulsion. However, it is sometimes desirable to incorporate the pigment in the emulsion by adding the dry pigment to the emulsion and then milling the resultant colored emulsion.

As is known, albino asphalts can be obtained from most asphaltic and mixed base crude oils by solvent extraction and distillation methods, such as those set out in U. S. patents of Merrill 2,081,496, Crawley 2,114,796, Anderson 2,201,466, Anderson 2,231,419, and Anderson Reissue 22,093.

Albino asphalts are characterized by their plasticity, translucency, freedom of asphaltenes, and complete solubility in light naphtha. At least two types may be distinguished according to their solubility in acetone, one type being soluble at 77° F. in an equal volume of acetone and the other being substantially insoluble. In general, the acetone-insoluble type albino asphalts are preferred, since they have a lower temperature susceptibility and therefore can be used under a greater range of climatic conditions.

Other asphalts, although not strictly albino asphalts, may be used if they are of sufficiently light color that they can be pigmented to the extent that they present a light-colored surface.

A colored albino asphalt emulsion when prepared according to the above method has a composition comprising 10% to 30%, and preferably 15% to 25%, by weight, of albino asphalt containing from .1% to 3%, and preferably 0.5% to 2%, by weight, (based on the asphalt) of a cation surface-active agent, 15% to 35%, by weight, of a pigment, 0.0% to 5%, by weight, of bentonite or the like, 0.1% to 3.0%, by weight, of ammonium salts of detergent-forming acids, 0.05% to 1.0%, by weight, of excess free ammonium hydroxide, and the remainder being water (all the percentages by weight are based on the total weight of the finished emulsion except where noted).

As illustrative of a preferred embodiment of the method of the present invention, the following example is given. Into a quantity of melted albino asphalt having a R and B softening point of 99° F. and a penetration of 130 at 77° F., was incorporated by stirring about 1% "paraffin wax amines" and 1% mixed $C_{14}$–$C_{20}$ fatty acids. The treated albino asphalt was then emulsified by feeding approximately equal portions of asphalt and an aqueous solution of ammonium hydroxide and casein into a colloid mill. The aqueous emulsifier solution consisted of 2%, by weight, of ammonium hydroxide and 1% of casein, which solution was substantially free of inorganic alkalies, such as sodium, potassium, and calcium hydroxides. To this resultant albino asphalt-in-water emulsion was added a dispersion of about 20% of drab pigment consisting of ferric oxide and diatomaceous earth and about 2% of bentonite in water, and the mixture was then run through the colloid mill. The resultant colored albino asphalt emulsion yields a paint of greatly improved resistance to color fading and disintegration on weathering.

Colored albino asphalt emulsions, such as the above, prepared according to the present invention were tested by painting aluminum panels, allowing them to dry, and placing the painted panels in a Weather-Ometer, wherein the painted surfaces are subjected alternately to ultraviolet from an arc light at 140° F. and to a driving rain. For comparison, some panels were painted with colored albino emulsions prepared in the same manner but without the incorporation of a cationic surface-active agent in the asphalt and by emulsifying the asphalt with an aqueous emulsifier solution comprising casein, rosin soap, and potassium hydroxide instead of an alkali-free solution of an ammonium salt of a fatty acid and free ammonia or ammonium hydroxide. All the painted panels were exposed to the action of the Weather-Ometer for the same length of time, i. e. 120 hours of sun light and 12 hours of rain, at the end of which the painted surfaces on the panels were inspected for fading, smoothness of surface, and general disintegration. In all cases the surfaces painted with the heretofore-proposed albino asphalt emulsions were faded in pigment coloring, checked or crazed in appearance with cracks running through the paint film, and covered with flakes of hard and non-cohesive material which could be easily removed. On the other hand the surfaces painted with the albino asphalt emulsions of the present invention had faded very little, if any, and were smooth and substantially uncrazed in appearance.

I claim as my invention:

1. In a method of preparing colored albino asphalt emulsions adapted to form fade- and disintegration-resistant asphaltic coatings, the steps of incorporating about 0.1% to 3% by weight of an oleophilic cation active agent into the albino asphalt before emulsification, and emulsifying the thus treated albino asphalt with an aqueous solution containing free ammonium hydroxide and an ammonium salt of a detergent-forming acid, said solution being substantially free from alkaline-reacting metal compounds.

2. In a method of preparing colored albino asphalt emulsions adapted to form fade- and disintegration-resistant asphaltic coatings, the steps of incorporating about 0.1% to 3% by weight of "paraffin wax amines" into the albino asphalt before emulsification, and emulsifying the thus treated albino asphalt with an aqueous solution containing free ammonium hydroxide and an ammonium salt of a detergent-forming acid, said solution being substantially free from alkaline-reacting metal compounds.

3. In a method of preparing colored albino asphalt emulsions adapted to form fade- and disintegration-resistant asphaltic coatings, the steps of incorporating about 0.1% to 3% by weight of a quaternary ammonium compound having at least one saturated hydrocarbon chain of at least 8 carbon atoms into the albino asphalt before emulsification, and emulsifying the thus treated albino asphalt with an ammonium salt of a detergent-forming acid, said solution being substantially free from alkaline-reacting metal compounds.

4. In a method of preparing colored albino asphalt emulsions adapted to form fade- and disintegration-resistant asphaltic coatings, the steps of incorporating about 0.1% to 3% by weight of a surface cation active amine having at least one aliphatic saturated hydrocarbon chain of at least 8 carbon atoms into the albino asphalt before emulsification, and emulsifying the thus treated albino asphalt with an ammonium salt of a detergent-forming acid, said solution being substantially free from alkaline-reacting metal compounds.

5. In a method of preparing colored albino asphalt emulsions adapted to form fade- and disintegration-resistant asphaltic coatings, the steps of incorporating from 0.1% to 3% by weight, on the basis of the albino asphalt, of an oleophilic cation active agent into the albino asphalt before emulsification, and emulsifying the thus treated albino asphalt with an ammonium salt of a detergent-forming acid, said solution being substantially free from alkaline-reacting metal compounds.

6. In a method of preparing colored albino asphalt emulsions adapted to form fade- and disintegration-resistant asphaltic coatings, the steps of incorporating about 0.1% to 3% by weight of an oleophilic cation active agent into the albino asphalt before emulsification, and emulsifying the thus treated albino asphalt with an aqueous solution containing free ammonium hydroxide and an ammonium salt of an alicyclic acid having at least 8 carbon atoms, said solution being substantially free from alkaline-reacting metal compounds.

7. In a method of preparing albino asphalt emulsions adapted to form fade- and disintegration-resistant asphaltic coatings, the steps of incorporating about 0.1% to 3% by weight of an oleophilic cation active agent into the albino asphalt before emulsification, and emulsifying the thus treated albino asphalt with an aqueous solution containing free ammonium hydroxide and from 0.1% to 3% by weight, based on the resultant emulsion, of an ammonium salt of a detergent-forming acid, said solution being substantially free from alkaline-reacting metal compounds.

8. In a method of preparing colored albino asphalt emulsions adapted to form fade- and disintegration-resistant asphaltic coatings, the steps of incorporating about 0.1% to 3% by weight of an oleophilic cation active agent into the albino asphalt before emulsification, and emulsifying the thus treated albino asphalt with an aqueous solution containing an ammonium salt of a detergent-forming acid and from 0.05% to 1% by weight, of free ammonium hydroxide, based on the resultant emulsion, said solution being substantially free from alkaline-reacting metal compounds.

9. In a method of preparing albino asphalt emulsions adapted to form fade- and disintegration-resistant asphaltic coatings, the steps of incorporating about 0.1% to 3% by weight of an oleophilic cation active agent into the albino asphalt before emulsification, and emulsifying the thus treated albino asphalt with an aqueous solution containing an ammonium salt of a detergent-forming acid and free ammonium hydroxide sufficient to give a pH of at least 8.0 but not over 11.0 to the aqueous phase of the resultant emulsion, said solution being substantially free from alkaline-reacting metal compounds.

10. In a method of preparing colored albino asphalt emulsions adapted to form fade- and disintegration-resistant asphaltic coatings, the steps of incorporating about 0.1% to 3% by weight of an oleophilic cation active agent into the albino asphalt before emulsification, and emulsifying the thus treated albino asphalt with an aqueous solution having a pH greater than 9.5 but not over 11.0 and comprising an ammonium salt of a detergent-forming acid, said solution being substantially free from alkaline-reacting metal compounds.

11. In a method of preparing colored albino asphalt emulsions adapted to form fade- and disintegration-resistant asphaltic coatings, the steps of incorporating about 0.1% to 3% by weight of an oleophilic surface cation active agent into a quantity of albino asphalt before emulsification, emulsifying the thus treated albino asphalt with an ammonium salt of a detergent-forming acid, said solution being substantially free from alkaline-reacting metal compounds, and incorporating a finely-divided pigment into the resultant emulsion.

12. In a method of preparing colored albino asphalt emulsions adapted to form fade- and disintegration-resistant asphaltic coatings, the steps of incorporating about 0.1% to 3% by weight of an oleophilic surface cation active agent into a quantity of albino asphalt before emulsification, emulsifying the thus treated albino asphalt with an ammonium salt of a detergent-forming acid, said solution being substantially free from alkaline-reacting metal compounds, and incorporating into the resultant emulsion an aqueous dispersion of finely-divided pigment and about 0.5% to 5% by weight, based on the resultant colored albino asphalt emulsion, of a finely-divided highly colloidal mineral emulsion-stabilizing agent.

13. In a method of preparing colored albino asphalt emulsions adapted to form fade- and disintegration-resistant asphaltic coatings, the steps of incorporating about 0.1% to 3% by weight of an oleophilic surface cation active agent into a quantity of albino asphalt before emulsification, emulsifying the thus treated albino asphalt with an ammonium salt of a detergent-forming acid, said solution being substantially free from alkaline-reacting metal compounds, and incorporating a finely-divided pigment and about 0.5% to 5% by weight, based on the resultant colored albino asphalt emulsion of bentonite.

14. In a method of preparing colored albino asphalt emulsions adapted to form fade- and disintegration-resistant asphaltic coatings, the steps of incorporating about 0.1% to 3% by weight of an oleophilic surface cation active agent into a quantity of albino asphalt before emulsification, emulsifying the thus treated albino asphalt with an ammonium salt of a detergent-forming acid, said solution being substantially free from alkaline-reacting metal compounds, and incorporating into the resultant emulsion an aqueous dispersion of finely-divided pigment and from 0.5% to 5% by weight of bentonite, based on the resultant colored albino asphalt emulsion.

15. An aqueous colored albino asphalt emulsion substantially free from alkaline-reacting metal compounds and adapted to form fade- and disintegration-resistant asphaltic coatings, comprising albino asphalt which contains about 0.1% to 3% by weight of an oleophilic cation active agent, finely divided pigment, an emulsifying amount of an ammonium salt of a detergent-forming acid, a small amount, sufficient to maintain the aqueous phase of the emulsion alkaline, of ammonium hydroxide, and water.

16. An aqueous colored albino asphalt emulsion substantially free from alkaline-reacting metal compounds and adapted to form fade- and disintegration-resistant asphaltic coatings, comprising 10% to 30% albino asphalt which contains about 0.1% to 3% by weight of an oleophilic cation active agent, finely divided pigment, an emulsifying amount of an ammonium salt of a detergent-forming acid, ammonium hydroxide in sufficient amount to obtain a pH of at least 9.5 but not over 11.0 in the aqueous phase of the emulsion, and water.

17. An aqueous colored albino asphalt emulsion substantially free from alkaline-reacting metal compounds and adapted to form fade- and disintegration-resistant asphaltic coatings, comprising 10% to 30% albino asphalt which contains about 0.1% to 3% by weight of "paraffin wax amines," finely divided pigment, an emulsifying amount of an ammonium salt of a higher molecular weight aliphatic acid, a small amount, sufficient to maintain the aqueous phase of the emulsion at a pH of from about 8.0 to about 11.0, of ammonium hydroxide, and water.

HARRY J. SOMMER.